(12) United States Patent
Kim

(10) Patent No.: US 6,694,241 B2
(45) Date of Patent: Feb. 17, 2004

(54) SHIFT CONTROL METHOD AND SYSTEM FOR AUTOMATIC TRANSMISSION

(75) Inventor: Joung-Chul Kim, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/174,060

(22) Filed: Jun. 17, 2002

(65) Prior Publication Data

US 2003/0100984 A1 May 29, 2003

(30) Foreign Application Priority Data

Nov. 28, 2001 (KR) .......................... 2001-74444

(51) Int. Cl.[7] .................................. G06F 7/00
(52) U.S. Cl. ............................ 701/55; 701/64
(58) Field of Search ........................ 701/51, 55, 56, 701/64, 66; 477/34, 110, 115

(56) References Cited

U.S. PATENT DOCUMENTS 6,454,678 B1 * 9/2002 Lee .......................... 477/141

* cited by examiner

Primary Examiner—Yonel Beaulieu
(74) Attorney, Agent, or Firm—Pennie & Edmonds LLP

(57) ABSTRACT

A shift control method and system is disclosed in which the number of shift signals generated within a predetermined time period after a first shift signal is determined and compared to a predetermined number. If the number is equal to or greater than the predetermined number then the shift according to a prior signal must be completed before the next shift is performed. The system includes a control unit and sensors for controlling the transmission according to the disclosed method. The system and method thus prevents or reduces shift shock by ensuring that hydraulic control is properly routed within the transmission.

15 Claims, 3 Drawing Sheets

SHIFT CONTROL METHOD AND SYSTEM FOR AUTOMATIC TRANSMISSION

FIELD OF THE INVENTION

The present invention relates to an automatic transmission, and more particularly, to an improved shift control method and system to decrease shift shock.

BACKGROUND OF THE INVENTION

Generally, an automatic transmission determines a target speed on the basis of a shift map using vehicle speed and throttle open angle as parameters, and performs hydraulic pressure duty control in order to operate specific engaging members within the transmission. Gear shifting is thus automatically performed.

However, if a significant number of shift signals are continuously generated, for example, due to frequent depressions of the accelerator pedal in a short time period, a new shift signal is generated before a shift according to a previous shift signal has been terminated. In this circumstance, shift operation according to the previous shift signal stops and a new shift operation according to the new shift signal is performed. Consequently, frequent changes of the target speed in the automatic transmission cause the hydraulic pressure to be incorrectly routed so that shift shock occurs.

SUMMARY OF THE INVENTION

In a preferred embodiment of the present invention, the shift control method includes generating a first shift signal for shifting to a target shift speed, detecting a shift signal generated within a predetermined period after the generation of the first shift signal, and determining if the number of shift signals generated is greater than or equal to a predetermined number, withholding synchronization according to the current shift signal, and determining if synchronization according to a previous shift signal has been terminated, if it is determined that the number of the shift signals generated is greater than or equal to the predetermined number, and performing synchronization according to the current shift signal after the synchronization according to the previous shift signal has been terminated.

In a preferred embodiment, the shift control method further comprises performing the synchronization according to the current shift signal if the number of shift signals generated is smaller than the predetermined number. It is also preferable that the predetermined number is three, and the predetermined period is determined based on a target speed determination history of the shift signals generated before the current shift signal.

In another preferred embodiment of the present invention, a shift control system for an automatic transmission comprises plural sensors and an appropriately programmed control unit. More specifically, a vehicle speed sensor detects vehicle speed and outputs a corresponding signal. A throttle position sensor detects the open angle of the throttle valve and outputs a corresponding signal. The transmission control unit determines a target speed on the basis of signals input from the vehicle speed sensor and the throttle position sensor, and generates a corresponding shift signal. Preferably, the transmission control unit is programmed with various instructions for shifting control. These instructions may include instructions for generating a first shift signal for shifting to a target shift speed, instructions for detecting a shift signal generated within a predetermined period from the generation of the first shift signal and determining if a number of shift signals generated is greater than or equal to a predetermined number, instructions for withholding synchronization according to the current shift signal and determining if synchronization according to a previous shift signal has been terminated if it is determined that the number of the shift signals generated is greater than or equal to the predetermined number, and instructions for performing synchronization according to the current shift signal after the synchronization according to the previous shift signal has been terminated.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
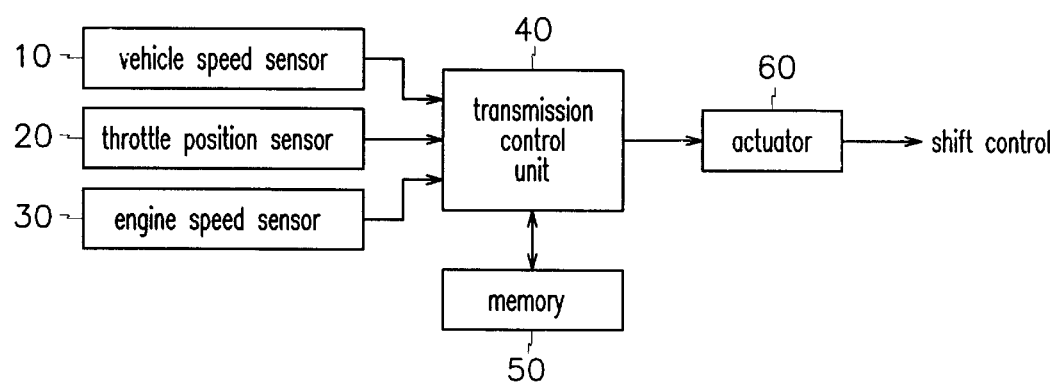
FIG. 1 is a block diagram of a shift control system according to the present invention.

As shown in FIG. 1, the shift control system according to the present invention includes a vehicle speed sensor 10, a throttle position sensor 20, an engine speed sensor 30, a transmission control unit 40, a memory 50, and an actuator 60.

The vehicle speed sensor 10 calculates a current vehicle speed, for example by using the speed of a transfer driven gear in the automatic transmission, and outputs a corresponding electrical signal. The throttle position sensor 20 detects a change rate of the position of the throttle valve that works together with an accelerator pedal and outputs a corresponding electrical signal. The engine speed sensor 30 detects engine speed based on calculation of crankshaft speed, and also outputs a corresponding electrical signal. Memory 50 comprises a shift pattern map as known in the art, using a vehicle speed and a throttle opening as parameters.

The transmission control unit 40 generally comprises a computer or other appropriately programmed processor and related components for executing control according to the teachings of the present invention. The transmission control unit 40 determines a target speed from the shift pattern map of the memory 50 using the detected throttle open angle and the detected vehicle speed, and generates a corresponding shift signal for shifting to the determined target speed. However, if the number of shift signals generated within a predetermined time period is greater than or equal to a predetermined number, a shift according to the shift signal generated after the predetermined number is reached occurs only after the shift according to the previous speed shifting has been terminated. For example, if the predetermined number is three, a shift according to the third shift signal is performed only after the shift according to the second shift signal is terminated, and a shift according to a fourth shift signal is performed only after a shift according to a third shift signal is terminated.

The actuator 60 is operated according to the signal input from the transmission control unit 40, and regulates the hydraulic pressure duty such that shift synchronization for the target speed is performed.

Figure 2:
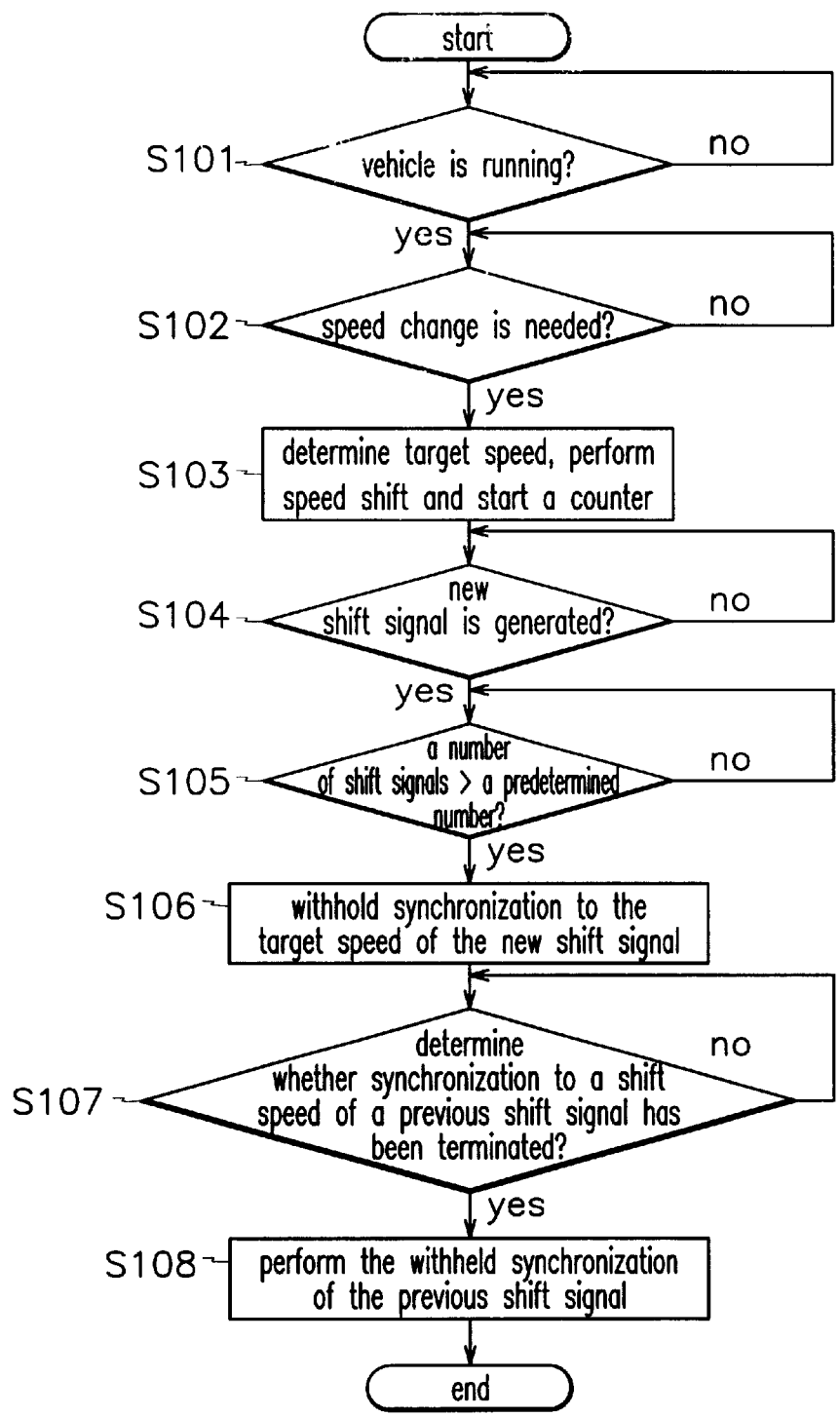
FIG. 2 is a flow chart showing a shift control method according to the present invention.

Referring to FIG. 2, shift control method according to a preferred embodiment of the present invention will be explained hereinafter.

The transmission control unit 40 determines if a speed change is demanded on the basis of the change rate of the throttle valve opening while a vehicle is running (S101 and S102). The determination of the need for a speed change in this step is conventionally based.

If the transmission control unit 40 determines that a speed change is needed, the transmission control unit 40 determines the target speed from the shift pattern map stored in the memory 50. The transmission control unit 40 then generates a corresponding shift signal and transmits the shift signal to the actuator 60 in order to control the hydraulic pressure duty such that a gear shift to the target speed is performed. A timer or counter is also started at this point (S103).

The transmission control unit 40 then determines whether a new shift signal for shifting to a new target speed is generated within a predetermined time period after starting the timer (S104). If it is not, synchronization for the shift to the demanded target speed is maintained.

If it is determined that the new shift signal has been generated, the transmission control unit 40 determines if the number of shift signals generated is greater than or equal to a predetermined number (S105). The predetermined number may be selected by a person skilled in the art for a particular vehicle.

If the new shift signal is generated after the predetermined period, the actuator 60 is operated by the shift signal such that a speed shift to the target speed is performed. On the other hand, if it is determined that the number of shift signals generated within the predetermined time period is greater than or equal to the predetermined number, the transmission control unit 40 withholds synchronization to the target speed of the new shift signal (S106). The control unit then determines whether synchronization to the speed shift according to the previous shift signal has been terminated (S107). For example, if the predetermined number is three and a third shift signal is generated within the predetermined time period, the transmission control unit 40 determines whether the synchronization for the speed shift according to the second shift signal is complete before the speed shift according to the third shift signal is performed.

After the synchronization for the speed shift according to the previous shift signal has been terminated, the transmission control unit 40 performs hydraulic pressure duty control in order to perform synchronization for the speed shift according to the new shift signal (S108). Once again, if the predetermined number is three, the synchronization for the speed shift according to the third shift signal is performed only after synchronization for the speed shift according to the second shift signal has been terminated.

The predetermined period is preferably determined on the basis of the target speed determination history before the current shift signal. For an example, if a first shift signal is a 4-2 kickdown shift signal, a second shift signal is a 2-4 lift-foot-up shift signal, and a third shift signal is a 4-2 kickdown shift signal, the predetermined period is determined considering a time period for terminating the 4-2 and 2-4 shifts. In this case, the predetermined period can be set as 2-3 seconds. On the other hand, if a first shift signal is a 4-1 kickdown shift signal, a second shift signal is a 1-4 lift-foot-up shift signal, and a third shift signal is a 4-1 kickdown shift signal, the predetermined period is determined considering a time period for terminating the 4-1 and 1-4 shifts. In this case, the predetermined period can be set as 3-4 seconds, because the time period for terminating the 4-1 and 1-4 shifts is generally longer than that for terminating the 4-2 and 2-4 shifts.

Figure 3:
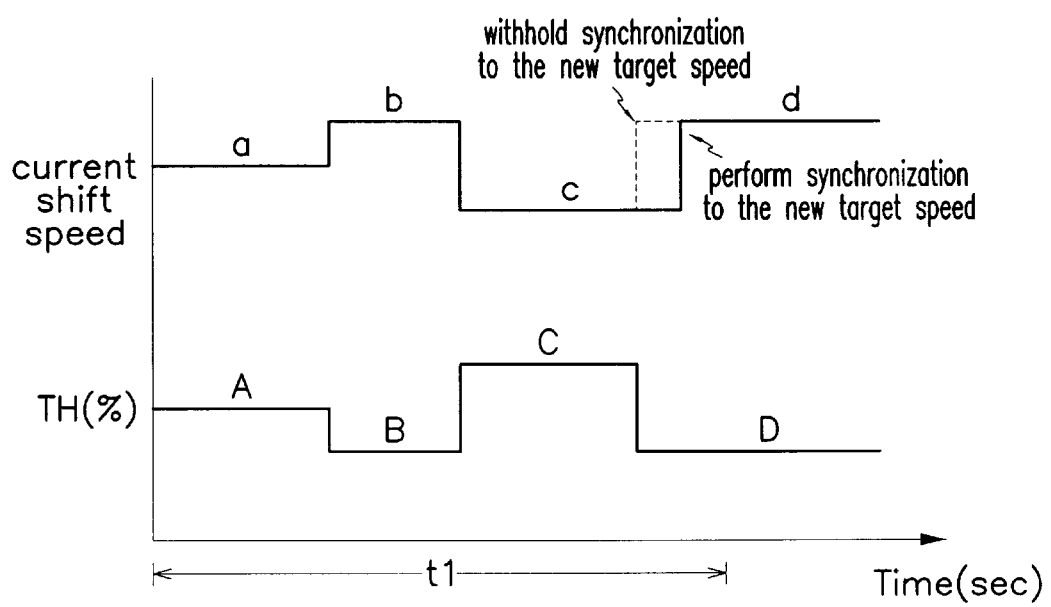
FIG. 3 shows a shift control pattern in the shift control method according the present invention.

As shown in FIG. 3, a current shift speed is maintained as 'a' while the throttle opening is A%, and a shift speed is changed from 'a' to 'b', if the throttle opening is changed from A% to B%. Then, if the throttle opening is changed from B% to C% because of the operation of the accelerator pedal, the target speed is determined as 'c' and hydraulic duty control for synchronization to the target shift speed 'c' is performed.

If the a target speed is changed from 'c' to 'd' because of the throttle opening change from C% to D% by releasing the accelerator pedal within a predetermined time period t1, synchronization for the speed shift to 'd' is performed only after synchronization for the speed shift to 'c' has been terminated as shown in the drawing.

As stated above, in the shift control method according to the present invention, if the number of shift signals generated is greater than or equal to the predetermined number within the predetermined period, synchronization for the speed shift according to the shift signal after the predetermined number is performed only after synchronization for the speed shift according to the previous shift signal has been performed, and thereby incorrect routing of the hydraulic pressure can be prevented so that shift shock can be decreased.

Although preferred embodiment of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

What is claimed is:

1. A shift control method for an automatic transmission comprising:

generating a first shift signal for shifting to a target shift speed;

detecting whether one or more shift signals are generated within a predetermined period from the generation of the first shift signal;

determining if a number of said one or more shift signals generated in said period is greater than or equal to a predetermined number;

determining if shift synchronization of a previous shift signal has been terminated;

withholding shift synchronization of a current shift signal if at least one shift signal is generated within said predetermined period, and the number of shift signals generated is greater than or equal to the predetermined number; and performing shift synchronization of the current shift signal after shift synchronization of a previous shift signal has terminated.

2. The method of claim 1, further comprising performing synchronization according to the current shift signal if the number of shift signals generated is smaller than the predetermined number.

3. The method of claim 1, wherein the predetermined number is three.

4. The method of claim 1, wherein the predetermined period is determined based on a target speed determination history of the shift signals generated before the current shift signal.

5. A shift control system for an automatic transmission comprising:
  a vehicle speed sensor for detecting a vehicle speed and outputting a corresponding signal;
  a throttle position sensor for detecting an open angle of a throttle valve and outputting a corresponding signal; and
  a transmission control unit for determining a target speed on the basis of signals input from the vehicle speed sensor and the throttle position sensor, and generating a corresponding shift signal, said transmission control unit including:
    instructions for generating a first shift signal for shifting to a target shift speed;
    instructions for detecting one or more shift signals generated within a predetermined period from the generation of the first shift signal;
    instructions for determining if a number of said one or more shift signals generated is greater than or equal to a predetermined number;
    instructions for determining if shift synchronization according to a previous shift signal has terminated;
    instructions for withholding shift synchronization of the current shift signal if it is determined that at least one shift signal was generated within said predetermined period, and the number of shift signals generated is greater than or equal to the predetermined number; and
    instructions for performing shift synchronization of the current shift signal after shift synchronization of a previous shift signal has terminated.

6. The system of claim 5, wherein the predetermined number is three.

7. The system of claim 5, wherein the predetermined period is determined based on a target speed determination history of the shift signals generated before the current shift signal.

8. A shift control system for an automatic transmission, comprising:
  a vehicle speed sensor providing an output signal representative of vehicle speed;
  a throttle position sensor providing an output signal representative of vehicle throttle position; and
  a transmission control unit programmed to determine a target speed based on said output signals and to generate a corresponding shift signal, wherein said control unit includes instructions to determine whether a number of shift signals generated within a predetermined time period is greater than or equal to a predetermined number, and to permit a shift according to a shift signal that exceeds the predetermined number within the predetermined time period to be performed only after a shift according to a previous shift signal is performed.

9. The shift control system according to claim 8, wherein transmission control unit is further programmed with instructions for:
  generating a first shift signal for shifting to a target shift speed;
  detecting shift signals generated within the predetermined time period;
  determining whether the shift signals generated within the predetermined time period exceed a predetermined number;
  withholding shift synchronization according to a current shift signal and determining if synchronization according to a previous shift signal has been terminated if the detected shift signals generated within the predetermined time period is equal to or exceeds the predetermined number; and
  performing shift synchronization according to the current shift signal after synchronization according to the previous shift signal is complete.

10. The shift control system according to claim 9, further comprising a memory containing a shift pattern map and said transmission control unit is programmed to determine the target speed based on said map.

11. The shift control system according to claim 10, wherein said predetermined number is three.

12. The shift control system according to claim 10, wherein said transmission control unit further comprises instructions for determining the predetermined time period based on a target speed determination history of the shift signals generated before a current shift signal.

13. A shift control method for an automatic transmission comprising:
  generating a first shift signal for shifting to a target shift speed;
  detecting whether one or more shift signals are generated within a predetermined period from the generation of the first shift signal, where said predetermined period is determined based on a target speed determination history of shift signals generated before a current shift signal;
  determining if a number of said one or more shift signals generated in said period is greater than or equal to a predetermined number;
  determining if shift synchronization of a previous shift signal has been terminated;
  withholding shift synchronization of a current shift signal if at least one shift signal is generated within said predetermined period, and the number of shift signals generated is greater than or equal to the predetermined number; and
  performing shift synchronization of the current shift signal after shift synchronization of a previous shift signal has terminated.

14. A shift control system for an automatic transmission comprising:
  a vehicle speed sensor for detecting a vehicle speed and outputting a corresponding signal;
  a throttle position sensor for detecting an open angle of a throttle valve and outputting a corresponding signal; and
  a transmission control unit for determining a target speed on the basis of signals input from the vehicle speed sensor and the throttle position sensor, and generating a corresponding shift signal, said transmission control unit including:
    instructions for generating a first shift signal for shifting to a target shift speed;
    instructions for detecting one or more shift signals generated within a predetermined period from the generation of the first shift signal, where the predetermined period is determined based on a target speed determination history of shift signals generated before a current shift signal;

instructions for determining if a number of said one or more shift signals generated is greater than or equal to a predetermined number;

instructions for determining if shift synchronization according to a previous shift signal has terminated;

instructions for withholding shift synchronization of the current shift signal if it is determined that at least one shift signal was generated within said predetermined period, and the number of shift signals generated is greater than or equal to the predetermined number; and instructions for performing shift synchronization of the current shift signal after shift synchronization of a previous shift signal has terminated.

15. A shift control system for an automatic transmission, comprising:

a vehicle speed sensor providing an output signal representative of vehicle speed;

a throttle position sensor providing an output signal representative of vehicle throttle position;

a transmission control unit programmed to determine a target speed based on said output signals and to generate a corresponding shift signal, wherein said control unit includes:

instructions to determine whether a number of shift signals generated within a predetermined time period is greater than or equal to a predetermined number, and to permit a shift according to a shift signal that exceeds the predetermined number within the predetermined time period to be performed only after a shift according to a previous shift signal is performed; and instructions for determining the predetermined time period based on a target speed determination history of shift signals generated before a current shift signal.

* * * * *